United States Patent
Bender et al.

(10) Patent No.: US 8,066,228 B2
(45) Date of Patent: Nov. 29, 2011

(54) SINGLE SLOTTED FLAP WITH SLIDING DEFLECTOR FLAP AND LOWERABLE SPOILER

(75) Inventors: Klaus Bender, Hamburg (DE); Ole Boettger, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 672 days.

(21) Appl. No.: 11/911,124

(22) PCT Filed: Apr. 7, 2006

(86) PCT No.: PCT/EP2006/003212
§ 371 (c)(1),
(2), (4) Date: Jan. 8, 2008

(87) PCT Pub. No.: WO2006/108579
PCT Pub. Date: Oct. 19, 2006

(65) Prior Publication Data
US 2008/0179464 A1    Jul. 31, 2008

Related U.S. Application Data

(60) Provisional application No. 60/670,201, filed on Apr. 11, 2005.

(30) Foreign Application Priority Data

Apr. 11, 2005   (DE) ................. 10 2005 016 578

(51) Int. Cl.
*B64C 9/16*   (2006.01)
(52) U.S. Cl. ......... 244/216; 244/213; 244/215; 244/217
(58) Field of Classification Search .......... 244/213–217, 244/198
See application file for complete search history.

(56) References Cited

U.S. PATENT DOCUMENTS

| | | | |
|---|---|---|---|
| 2,261,363 A | 11/1941 | Griswold | |
| 2,700,516 A | 1/1955 | Nazir | |
| 2,772,058 A | 11/1956 | Grant | |
| 2,920,844 A * | 1/1960 | Marshall et al. | 244/207 |
| 2,924,399 A * | 2/1960 | Titus et al. | 244/216 |
| 2,987,277 A * | 6/1961 | Richardson et al. | 244/90 R |
| 3,131,873 A * | 5/1964 | Sanders | 244/12.3 |
| 3,677,504 A * | 7/1972 | Schwarzler | 244/212 |
| 3,757,121 A * | 9/1973 | Poirier | 250/316.1 |
| 3,897,029 A | 7/1975 | Calderon | |
| 3,921,942 A * | 11/1975 | Bracka | 244/87 |
| 4,784,355 A | 11/1988 | Brine | |
| 4,905,934 A | 3/1990 | Chin | |
| 6,601,801 B1 | 8/2003 | Prow et al. | |

FOREIGN PATENT DOCUMENTS

| | | |
|---|---|---|
| DE | 1813407 | 7/1970 |
| DE | 1943037 | 3/1971 |
| DE | 2216710 | 10/1973 |
| DE | 4334680 A1 | 4/1995 |
| EP | 1407964 A2 | 4/2004 |
| JP | 5-238488 A | 9/1993 |
| RU | 2187445 C1 | 8/2002 |
| WO | 96/36532 | 11/1996 |

* cited by examiner

*Primary Examiner* — Tien Dinh
*Assistant Examiner* — Philip J Bonzell
(74) *Attorney, Agent, or Firm* — Christopher Paradies; Fowler White Boggs P.A.

(57) ABSTRACT

A device for adjusting the lift characteristics of an aircraft with a high lift device that is movably attachable to a wing element and that includes at least one slot covering device, where the at least one slot covering device, is movably attachable to the wing element. The slot covering device is designed to regulate the size of a slot between the wing element and the high lift device.

13 Claims, 1 Drawing Sheet

SINGLE SLOTTED FLAP WITH SLIDING DEFLECTOR FLAP AND LOWERABLE SPOILER

REFERENCE TO RELATED APPLICATIONS

This application claims the benefit of the filing date of German Patent Application No. 10 2005 016 578.8 filed Apr. 11, 2005 and of U.S. Provisional Patent Application No. 60/670,201 filed Apr. 11, 2005, the disclosures of which applications are hereby incorporated herein by reference.

FIELD OF THE INVENTION

The field relates to a device and a method for adjusting lift characteristics, to a means of locomotion, and to the use of a device for adjusting lift characteristics in an aircraft.

BACKGROUND OF THE INVENTION

In order to attain a particular lift during slow flight, modern commercial aircraft may require high lift devices during the takeoff and landing phases. During the takeoff phase, high lift devices are used to generate a high coefficient of lift combined with little resistance and a low noise level. Likewise, these conditions apply during the landing phase, wherein in this case, the low resistance plays a subordinate role because resistance makes it possible to concurrently reduce the aircraft speed.

Up to now, high lift devices or additional flaps have been affixed to airfoils or wings and have been extended or retracted or swivelled as required. In this arrangement, so-called slats can be activated on the leading edge of the wing, and so-called flaps can be activated on the trailing edge of the wing in order to have an influence on the wing surface and/or the wing geometry.

The geometry and the surface of the wing profile may have a decisive influence on the flight characteristics of an aircraft, in particular at critical flight states, e.g. during the takeoff or landing phases. Since, as a rule, an aircraft spends by far the greatest part of its time cruising, the wing profiles may be optimised most of the time to this flight state so that additional measures have to be taken for takeoff and landing. In this context, increasing the maximum lift may play an important role in order to shorten the takeoff distance or in order to achieve minimum landing speed during landing. In order to meet these two opposing requirement profiles, namely high lift during takeoff and landing versus the best possible economy during cruising, the geometry of wing profiles may be varied with the use of flap systems.

The profile surface is controlled by intended extension and retraction of high lift devices such that the size of the wing surface changes. On the other hand, it is possible to swivel high lift devices, as a result of which the profile curvature can be adjusted. With an increase in the profile curvature and with a larger wing surface the airflow on the underside of the wing is increasingly decelerated and on the top of the wing is accelerated such that the pressure gradient between the top and the underside of the wing increases and a higher coefficient of lift results.

Several flap systems have been designed that have different effects on flight characteristics. The normal wing flap is arranged between the aileron and the fuselage, on the rear airfoil end. As a rule, the wing flap can deflect downward only; it is primarily used to change the profile curvature, as a result of which higher lift and higher resistance are generated.

One embodiment of the wing flap is the slotted flap. The slotted flap, too, may only deflect downwards. When compared to the wing flap, the slotted flap has a slot between the wing and the high lift device, through which slot air can flow from the underside of the wing to the top.

The Fowler flap is a further embodiment of the wing flap. In principle, the Fowler flap is a slotted flap which not only hinges downward but may also be extended towards the rear. Apart from an increase in the curvature, this may additionally provide a larger wing surface.

Already in the takeoff position, the high lift devices are extended in order to increase lift and thus reduce the take-off speed that is required. As a result of this, the slot already opens, although stall on the flap is not expected as yet.

U.S. Pat. No. 6,601,801 B1 discloses a device in which a slot that results in the aileron of an aircraft may be regulated by an additional element. This additional element is mechanically force-controlled or guided and moves on a fixed axis when the aileron is deflected.

This may result in the lift generated by the high lift devices being reduced correspondingly (pressure equalisation between the top and the underside) and in the noise level being increased (high air-flow speed in the slot).

SUMMARY OF THE INVENTION

The examples described and drawings rendered are illustrative and are not to be read as limiting the scope of the invention as it is defined by the appended claims.

According to one example, a device and a method for adjusting the lift characteristics, by a means of locomotion, and by the use of a device for adjusting lift characteristics in an aircraft with the characteristics according to the independent claims may be provided.

According to an embodiment of the device, a device for adjusting lift characteristics is provided. The device comprises a high lift device that is movably attachable to a wing element, and to at least one slot covering device, wherein the at least one slot covering device, is movably attached to the wing element and/or to the high lift device, and wherein the at least one slot covering device, is designed to regulate the size of a slot between the wing element and the high lift device.

According to yet another embodiment of the device, a device for adjusting lift characteristics with the features described above are used in an aircraft.

According to an example of the device, a slot between the high lift device and, for example, a wing element may be controlled in such a way that an ideal slot size may be set for any operating state at a given time. Due to this slot control or slot regulation, above all during the takeoff phase of an aircraft, the slot may be regulated, i.e. closed, in such a way that noise generated by the airflow through the slot may be reduced, that resistance may be reduced, and that lift may be increased. In this way, better climbing rates may be achieved. On the other hand, there may be the option, as a result of the above, of reducing engine output, which again may be result in a lower noise level and also may be in reduced fuel consumption.

Optimising the slot both for the takeoff position and the landing position by means of the kinematics of the high lift device may be no longer mandatory because the slot can be regulated by means of the slot covering device. In this way, the construction of the load-bearing kinematics may be clearly simplified and thus, a weight reduction may be achieved, which in aircraft engineering represents one of the significant optimisation potentials.

Furthermore, in one example of the device, the device may comprise a wing element.

According to another embodiment of the device, the at least one slot covering device, is attached to the underside of the wing element, so as to be movable and controllable, for regulating the size of a slot between the wing element and the high lift device.

According to a further embodiment of the device, the at least one slot covering device, is attached so as to be rotatable on the longitudinal axis of the wing element. In this way, the at least one slot covering device may conform to the high lift device that is hinged downwards or extended rearwards at any desired angle, as a result of which aerodynamic advantages may arise.

According to a further embodiment, the at least one slot covering device is movably and controllably attached to the top of the wing element for the purpose of regulating the size of a slot between the wing element and the high lift device.

According to another embodiment, the at least one slot covering device, is movably and controllably attached to an indentation in the wing element, which results in aerodynamic advantages. Concretely, the slot covering device may be accommodated or flush-mounted in the indentation in a space-saving way and with may be favourable airflow characteristics.

According to another embodiment, the high lift device is movably attached to the rear region of the wing element. These high lift devices that are attached to the rear region of the wing are referred to as flaps.

According to another embodiment, the high lift device is movably attached to the front region of the wing element.

These high lift devices that are attached to the front region of the wing are referred to as slats.

According to another embodiment, the high lift device can be hinged downward and/or extended rearward from the wing element.

According to a further embodiment, the device comprises a rail-supported structure and/or structure supported by multiple guide rods for controlling the high lift device and/or the slot covering device. In a rail-supported structure the high lift devices and/or the slot covering devices move along a predetermined guide rail. This guide rail may change its shape and alignment in order to position the high lift devices or the slot covering devices. In the case of a structure that is supported by multiple guide rods, the high-lift device and/or the slot covering device are/is moved into a desired position by way of rods, which may for example be driven hydraulically or pneumatically.

The high lift devices used in the device may for example be wing flaps, single slotted flaps, Fowler flaps, double slotted flaps, triple slotted flaps, Fester slats or Handley Page slats.

In the case of double slotted flaps or triple slotted flaps, several flaps one behind the other are extended or hinged, as a result of which several slots arise. With the device according to one example, regulating the size of these slots by means of several slot covering devices may be allowed.

According to one example, a method for adjusting lift characteristics is created. In this method, the size of a slot between the wing element and the high lift device is regulated by means of a slot covering device.

According to a further embodiment of the method, during the takeoff phase of an aircraft, the high lift devices are extended rearward and/or forward and/or are hinged downward. In a further embodiment of the method, during the takeoff phase, the slot may be regulated or closed by means of the controllable slot covering devices.

According to a further embodiment of the method, during the landing phase of an aircraft, the high lift devices are extended rearward and/or forward and/or are hinged downward.

In a further embodiment of the method, the slot may be optimally adjusted by the slot covering device. Due to the slow flight speed during the landing phase stalling on the top of the wing may occur because the pressure gradient at that location becomes excessive. The slot then allows for an exchange of air between the top of the wing and the underside of the wing. Concretely, the slot may concurrently act as a jet and may accelerate the airflow between the underside of the wing and the top of the wing. In this way, the aerodynamic resistance and thus the noise level may increase. With the adjustable slot size, one may optimally adjust the resistance and the noise level.

According to a further embodiment of the method, control of the slot covering device may be carried out by means of the on-board computer, which on the basis of aircraft data such as for example, the flight speed, angle of attack, wing profile, air pressure, air temperature or flight altitude controls the slot covering device or the high-lift device in such a way that the size of the slot may be improved.

According to one example, a means of locomotion with the characteristics described above is created.

The embodiments of the device also relate to the method and to the means of locomotion, as well as to their use, and vice-versa.

The device and the method according to one example, provide an effective way of adjusting the lift characteristics, the aerodynamic resistance and the slot noise level so that the effectiveness of high lift devices may be improved. Furthermore, the device may simplify construction of the high lift devices and thus may result in a reduction in weight.

BRIEF DESCRIPTION OF THE FIGURES

Below, for further explanation and for better understanding of the device, embodiments are described in more detail with reference to the enclosed drawings.

In the various figures the same reference characters are used for identical or similar components. The illustrations in the figures are diagrammatic and not to scale.

DETAILED DESCRIPTION

The examples described and drawings rendered are illustrative and are not to be read as limiting the scope of the invention as it is defined by the appended claims.

Figure 1:
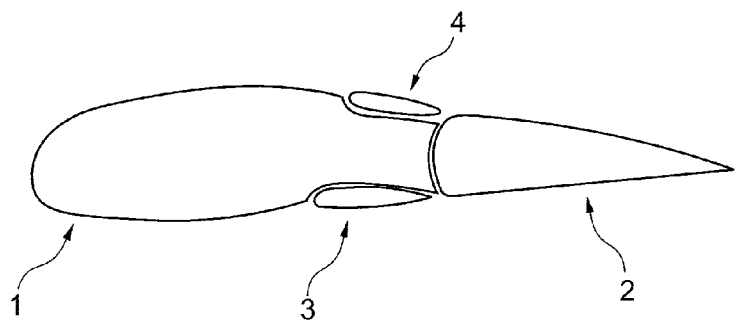
FIG. 1 shows a diagrammatic representation of a wing element with retracted high lift devices according to an embodiment of the device.

FIG. 1 shows a device for adjusting the lift characteristics of an aircraft, according to an embodiment of the device.

The device comprises a wing element 1, a high lift device 2 and two slot covering devices 3, 4. The high lift device 2 is movably attached to the wing element 1. The slot covering devices 3, 4 are also movably attached to the wing element 1. The slot covering devices 3, 4 are designed so as to regulate the size of a slot 7 between the wing element 1 and the high lift device 2.

FIG. 1 shows the wing element 1 with the high lift device 2 retracted. This configuration is preferably used during cruising so as to keep the wing surface small and thus may be reduce resistance. The wing profile from FIG. 1 may be designed such that at a specified angle of attack, the lift force is in equilibrium with the opposing weight force. In this way at constant altitude, cruising with little resistance may be achieved. In this arrangement, the slot covering devices 3 and 4, according to one example, may also retracted and due to aerodynamic advantages may be attached to indentations 8 in the wing profile 1.

The high lift device 2 can also be referred to as a "single slotted flap". The slot covering device 3 may also be referred to as a "deflector". The slot covering device 4 may also be referred to as a "spoiler" or "movable shroud".

Figure 2:
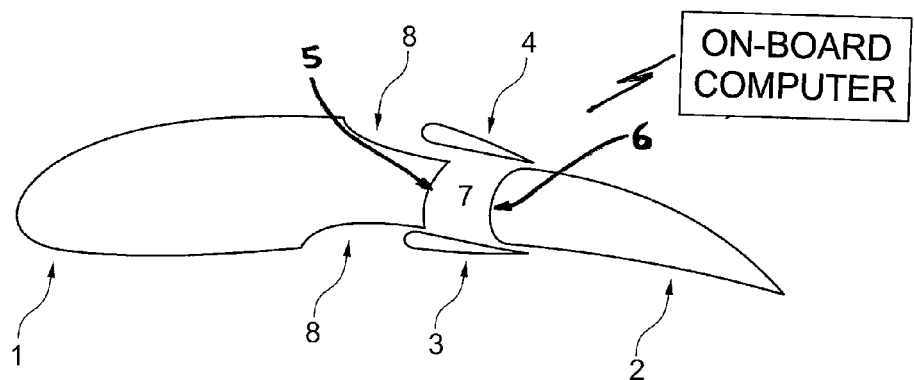
FIG. 2 shows a diagrammatic representation of a wing element with an extended high lift device in takeoff configuration, according to an embodiment of the device.

FIG. 2 shows a wing configuration during the start phase. The high lift device 2 is extended in order to increase the coefficient of lift. This may have the effect that the aircraft may achieve lift-off at a slower takeoff speed or with a shorter acceleration distance. With the wing configuration according to one example, the slot 7, which normally forms between the rear region 5 of the wing element 1 and the front region 6 of the high lift device 2, may be selectively and controllably or regulatably closed. To this effect the slot covering devices 3, 4 extend in the direction of the high lift device 2 so as to close the slot 7. The slot covering devices 3, 4 may be designed such that they may change their angle on the longitudinal axis of the wing and in this way may conform to the surface of the wing element 1 and the high lift device 2. In this wan aerodynamic advantages may be achieved, for example, a reduction in resistance. Furthermore, when the slot is closed, the slot noises caused by the aerodynamics during the takeoff phase are may be reduced. When the slot 7 is closed, the aerodynamic losses that are also caused by the slot 7 may be avoided so that far better climbing rates may be achieved. In this wan it may be also possible for example to use less powerful engines, which may use less fuel.

Figure 3:
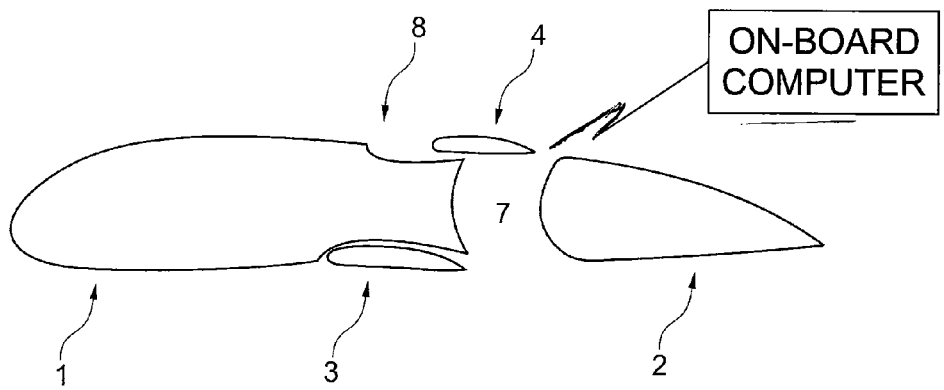
FIG. 3 shows a diagrammatic representation of a wing element with an extended high lift device in landing configuration, according to an embodiment of the device.

FIG. 3 shows a wing configuration during the landing phase. During the landing phase of an aircraft, airflow stability may be required at very low speeds and at a high coefficient of lift. To this effect, the high lift devices 2 are extended so as to in this way achieve a larger wing surface and a larger profile curvature. Thus, the airflow may be strongly deflected across a large or long surface, as a result of which the pressure gradient between the top of the wing and the underside of the wing may be increased, and a high coefficient of lift may be achieved. With the slow speeds during the landing phase and the concurrently strong deflection of the low-energy airflow, above all on the top of the wing, there is a danger for the laminar airflow to assume a turbulent state and finally to detach from the top of the wing. In order to prevent such a stall, the slot 7 may be opened in a targeted way in order to enable an exchange of the fluid between the top of the wing and the underside of the wing. When the slot is open, the higher-energy slower airflow may reach the lower-energy faster airflow at the top of the wing so as in this way to stabilize the air flow on the top of the wing. The slot covering device 4, is regulated independently of the slot covering device 3, as shown in FIG. 3, for example.

As a countermove, higher resistance and louder slot noises may result. With the wing configuration according to one example, the slot size may be controlled and thus, the aerodynamic characteristics of the slot. Depending on the properties of the airflow the slot size may be adjusted by the slot covering devices 3, 4 such that stalling may be avoided and yet the resistance and noise level may be reduced.

In this arrangement, control of the slot covering devices 3, 4 may be carried out by means of the on-board computer 21, which on the basis of aircraft data such as for example the flight speed, angle of attack, wing profile, air pressure, air temperature or flight altitude controls the slot covering devices 3, 4 or the high lift device 2 such that the slot 7 is optimal in size.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

Alternative combinations and variations of the examples provided will become apparent based on this disclosure. It is not possible to provide specific examples for all of the many possible combinations and variations of the embodiments described, but such combinations and variations may be claims that eventually issue.

What is claimed is:

1. A device for adjusting the lift characteristics of an aircraft, comprising:
    a high lift device;
    a first slot covering device;
    a second slot covering device; and
    a wing element;
wherein the high lift device is movably attached to the wing element such that a slot is defined by a gap formed between the high lift device and the wing element, when the high lift device is extended rearwardly from the wing element;
    the first slot covering device and the second slot covering device are movably attached to the wing element; the first slot covering device is movably and controllably attached on an underside of the wing element to regulate an opening size between the underside of the wing element and the high lift device; and the second slot covering device is movably and controllably attached to a top of the wing element to regulate an opening size of the slot between the top of wing element and the high lift device, such that the opening size of the slot between the top of the wing element and the high lift device and the opening size of the slot between the underside of the wing element and high lift device are regulatable; and
    the first slot covering device, the second slot covering device, or both the first slot covering device and the second slot covering device are retractable into indentations in the wing element; and
    the first slot covering device, the second slot covering device, or both the first slot covering device and the second slot covering device being movable rearward along the indentations such that the first slot covering device, the second slot covering, or both the first slot covering device and the second slot covering device extend in the direction of the high lift device so as to selectively and controllably or regulatably close the slot when the high lift device is extended rearwardly from the wing element.

2. The device of claim 1, wherein the first slot covering device and the second slot covering device are attached so as to be rotatable on a longitudinal axis of the wing element.

3. The device of claim 1, wherein the high lift device is movably attached to a rear region of the wing element.

4. The device of claim 1, wherein the high lift device is hingedly attached to the wing element such that the high lift device is capable of being hinged downward from the wing element.

5. The device of claim 1, wherein the first slot covering device is independently movable from the second slot covering device such that the opening size of the slot between the underside of the wing element and the high lift device is independently regulatable from the opening size of the slot between the top of the wing element and the high lift device by regulating the movement of the first slot covering device and the second slot covering device independently.

6. A method for adjusting the lift characteristics of an aircraft using the device of claim 1, comprising:
   regulating the opening size of the slot between the top, underside or both top and underside of the wing element and the high lift device using the first slot covering device, the second slot covering device or both the first slot covering device and the second slot covering device during one phase of flight;
   retracting the first slot covering device, the second slot covering device or both the first slot covering device and the second slot covering device into an indentation in the wing element during another phase of flight; and
   moving the first slot covering device, the second slot covering device, or both the first slot covering device and the second slot covering device being movable rearward along the indentations such that the first slot covering device, the second slot covering device, or both the first slot covering device and the second slot covering device extend in the direction of the high lift device and selectively and controllably or regulatably close the slot when the high lift device is extended rearwardly from the wing element.

7. The method of claim 6, wherein the method includes a step of extending rearward the high lift device or a step of hinging downwardly the high lift device or both steps of extending and hinging during a takeoff phase or a landing phase or both takeoff and landing phases.

8. The method of claim 6, wherein the step of regulating of the method includes a step of closing the slot during a takeoff phase by using both the first slot covering device and the second slot covering device.

9. The method of claim 6, wherein the method includes a step of extending rearwardly the high lift device or a step of hinging downwardly the high lift device Or both steps of extending and hinging during a landing phase of the aircraft.

10. The method of claim 6, wherein the step of regulating of the method includes a step of controlling the slot by regulating the second slot covering device, independently of the first slot covering device, such that stalling is prevented during a landing phase.

11. The method of claim 6, further comprising:
    regulating the opening size of the slot between the underside of the wing element and the high lift device independently of the opening size of the slot between the top of the wing and the high lift device by moving the second slot covering device independently of the first slot covering device.

12. The method of claim 6, wherein the method includes a step of providing an on-board computer for controlling the first and second slot covering devices or the high lift device or both the first and second slot covering devices and the high lift device.

13. The method of claim 12, wherein the step of providing the on-board computer includes selecting control parameters of the on-board computer from the group consisting of flight speed, angle of attack, wing profile, air pressure, temperature and flight altitude.

\* \* \* \* \*